April 12, 1927.

J. HUMBRECHT

1,624,733

PERISCOPE MORE PARTICULARLY FOR SUBMARINES

Filed Aug. 23, 1921 7 Sheets-Sheet 1

Inventor:
Jules Humbrecht

April 12, 1927.　　J. HUMBRECHT　　1,624,733
PERISCOPE MORE PARTICULARLY FOR SUBMARINES
Filed Aug. 23, 1921　　7 Sheets-Sheet 3

Inventor:
Jules Humbrecht
by
Leo J. Matty
atty.

Patented Apr. 12, 1927.

1,624,733

UNITED STATES PATENT OFFICE.

JULES HUMBRECHT, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

PERISCOPE MORE PARTICULARLY FOR SUBMARINES.

Application filed August 23, 1921, Serial No. 494,497, and in Germany January 19, 1916.

(GRANTED UNDER THE PROVISIONS OF THE ACT OF MARCH 3, 1921, 41 STAT. L., 1313.)

This invention relates to periscopes more particularly for submarines, with a light admission opening adjustable relatively to the instrument support that is to say to the submarine, the eye-piece of which is arranged at a fixed height that is to say at a height independent of the position at the time of the light admission opening. The object of the invention is to make possible a very perfect utilization of the space available in the vertical direction, that is to say in the direction of longitudinal movement of the casing part carrying the light admission opening, relatively to the instrument carrier or support. According to the invention, this object is attained by the rigid casing part carrying the light admission opening, being mounted on the instrument carrier in a manner so adjustable that its bottom end can be lowered down to below the eye-piece. In this way it is possible to utilize practically the whole of the space situated in the direction of movement of the rigid part of the casing below the light admission opening, whilst at the same time the observer has a very convenient observation position at any desired vertical adjustment of the light admission opening.

The optical arrangement of the elements that makes possible such a longitudinal movement of the rigid casing part carrying the light admission opening, relatively to the eye-piece, can be different. For instance, the movement could take place in well known manner between two telescopic systems belonging to the optical system of the instrument, or when there are more than two telescopic systems in the optical system of the instrument, between each two telescopic systems of the instrument. Longitudinal movement of the instrument parts could also only be rendered possible by providing the rigid adjustable casing part carrying the light admission opening, with an optical system of finite focal length, and by effecting, simultaneously with the movement of the said rigid casing part carrying the light admission opening, a movement of a reflector arranged between the said casing part and the eye-piece and guiding the rays to the eye-piece, in such a manner that the prescribed distance of the focal plane of the system, situated in the rigid adjustable casing part, from the eye-piece is always maintained.

In such construction the reflector guiding the rays to the eye-piece may either be provided with a separate drive in order to compensate for the displacement of the focal plane of the optical elements mounted within the adjustable casing element or the reflector can firmly be connected with the adjustable casing element and the latter provided with a slidable lens element in order to secure the prescribed distance of the image plane of the objective from that of the eye-piece.

The variation of the height of the light admission opening of the periscope is preferably combined with a variable direction of vision; the latter can be obtained either by rotation of the whole periscope or by rotation of the casing element of the periscope carrying the light admission opening independently from the casing element carrying the eye-piece or by providing the periscope with a rotatable cap carrying the eye-piece.

The invention is illustrated in the accompanying drawings, in which—

Figure 1:
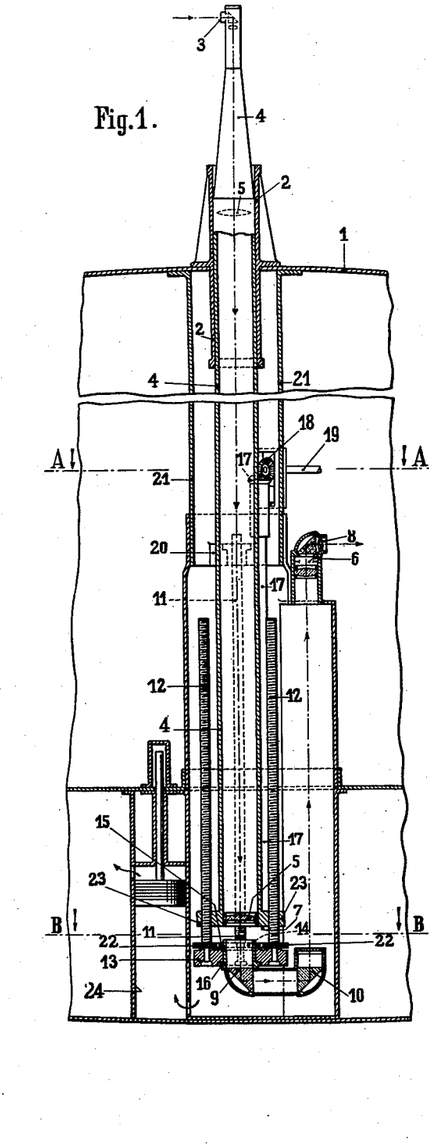
Figures 1-3 show, in vertical longitudinal section and in two cross-sections, along the lines A—A and B—B of Fig. 1 respectively a construction of an instrument in which the rigid adjustable casing part carrying the light admission opening, is provided with an optical system of finite focal length.
Figure 2:
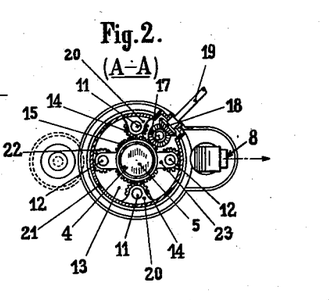
Figure 3:
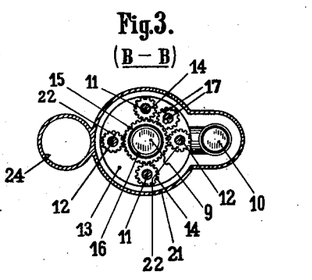

In the construction in Figures 1–3, the carrier or support of the instrument is assumed to be the deck 1 of a submarine. In the deck 1 is secured in the usual manner a guide sleeve 2 in which, also in well known manner, is adjustably arranged the rigid casing tube 4 carrying the light admission opening 3. The lenses 5 secured in the rigid tube 4, form together an optical system of finite focal length, the image plane of which is assumed to be at 6.

The rigid tube 4 is shown in its low position, its bottom edge 7 being below the eye-piece 8 and projecting in a shaft in the lower part of the boat, close to the bottom of the boat. Between the bottom end 7 of the adjustable rigid casing tube 4 and the eye-piece 8, are mounted two reflecting prisms 9, 10 which guide towards the eye-piece 8 the rays coming from the light admission opening 3. In order to enable the instrument to be used for observation at any time, it is necessary that, whatever be the vertical position of the light admission opening, the image of the target produced by the optical system 5 of finite focal length, should be produced in the image plane 6 of the eye-piece 8. To ensure such a reproduction, the reflectors 9, 10 have to be moved in accordance with the movement of the tube 4. This movement is effected by two pairs of screw spindles 11, 12. The screw spindles 11 are mounted with their ends in a rotatable, but not adjustable manner, in a plate or disc 13 mounted in the casing part carrying the prisms 9, 10. On each of the screw spindles 11 is mounted a toothed wheel 14 meshing with a toothed wheel 15 rotatably mounted on the casing part 16 carrying the prisms 9, 10. The driving of the toothed wheels 14 of the spindle is effected from the toothed wheel 15 with which engages a pinion 17 driven by a pinion 18 on a driving shaft 19. Rotation of the shaft 19 rotates therefore simultaneously the two spindles 11. Each of the spindles 11 passes through a nut 20 provided on a casing tube 21 secured to the body of the boat. Owing to the connection described, rotation of the spindles 11 by the shaft 19 results in a raising and lowering of the prisms 9, 10 relatively to the fixed instrument carrier or support (body of the boat). In the same way as the pair of spindles 11, the pair of spindles 12 are connected to the plate 13. Each of the two spindles 12 is also provided with a gear wheel 22 meshing with the gear wheel 15, so that rotation of the gear wheel 15 results also in a rotation of the spindles 12. Each of the spindles 12 passes through a nut 23 at the bottom end of the rigid pull-out tube 4. The connection of the spindles 12 to the plate 13 results in the raising or lowering of the plate 13 with the prisms 9, 10, producing at the same time a raising and lowering of the tube 4. As the raising and lowering of the plate 13 takes place jointly with a rotary motion of the spindles 12, there takes place at the same time a screwing of the spindles 12 in or out of the nut 23, so that the movement imparted to the rigid tube 4 when raising or lowering the prisms 9, 10, is a double one, namely first the longitudinal movement due to the longitudinal movement of the spindles 12, and secondly the longitudinal movement produced by the rotation of the spindles 12. At each raising or lowering of the light admission opening 3, the tube 4 is accordingly moved through a distance double that of the prisms 9, 10, so that the distance of the light admission opening 3 from the image plane 6 of the eye-piece always remains the same, and accordingly the image of the target produced by the optical system 5, is also always produced in the plane 6 of the eye-piece.

The movement of the tube 4 results in a change in the free air space in the casing surrounding the instrument. When completely shut off from the outer air, there would therefore take place an increase of pressure, or a reduction, in the interior of the whole casing, which would be practically combined with a flow of air through the casing joints. During the pulling out of the periscope, the fresh air drawn in would be liable to introduce dust and moisture. In order to avoid this, there is provided a pressure equalizing chamber 24.

Figure 4:
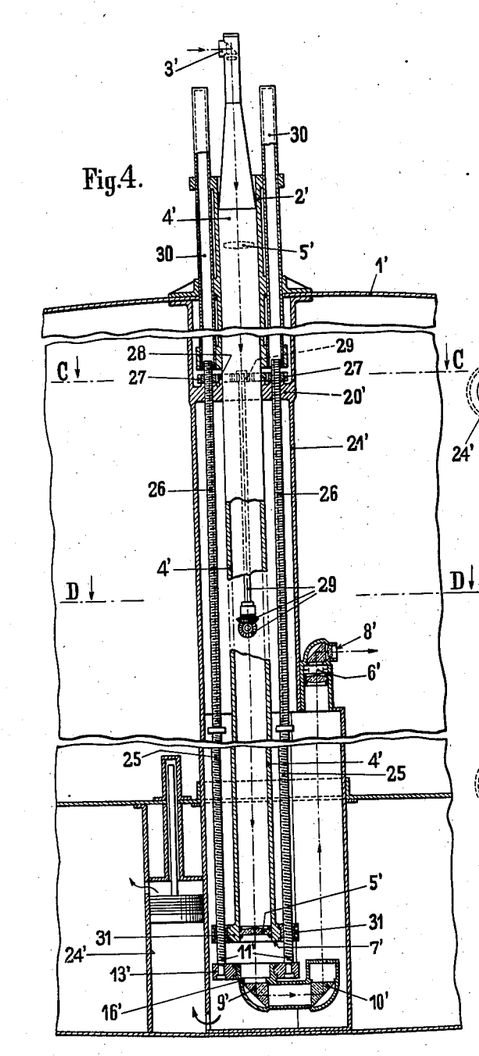
Figures 4-6 show likewise in axial section and in two cross-sections along the lines C—C and D—D (Fig. 4) respectively another construction of the instrument based on the same optical principle, with a modified driving device for its object-glass part.
Figure 5:
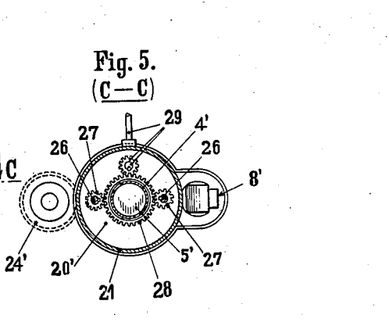
Figure 6:
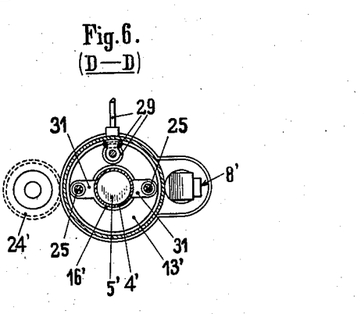

In the construction shown in Figures 4–6, there are the same optical elements as in the construction in Figures 1–3. They are marked with the same reference numbers as in Figures 1–3, only with the difference that the said reference figures have an index stroke. In the casing part $16^1$ carrying the prisms $9^1$, $10^1$ is again mounted a plate $13^1$, in which two spindles $11^1$ are rotatable, but not adjustable. These spindles are in this case provided at different portions with screw threads of opposite directions. The two screw thread sections are marked 25, 26. The screw section 26 passes through a nut 20¹ secured to the casing tube 21¹, so that a rotation of the spindles 25, 26 produces a raising or lowering of the prisms 9¹, 10¹. On the section 26 of the spindle is mounted, non-rotatably relatively to the spindle, but longitudinally adjustably, a rotatable gear wheel 27 "fixed in space" meshing with a gear wheel 28 rotatably mounted on the nut 20¹. This gear wheel 28 can be rotated by a driving spindle 29 by means of a system of rods, the intermediate members of which are also marked 29. Any movement of the driving rods 29 results therefore in a rotation of the spindles 25, 26 and therefore in a raising or lowering of the prisms, 9¹, 10¹. The spindle sections 26 are surrounded by protective casings 30. The spindle sections 25 are mounted in a nut 31 at the bottom end of the rigid adjustable tube 4¹. This arrangement results in the tube 4¹ not only participating in every longitudinal movement of the spindles 25, 26 or in the thereby produced movement of the prisms 9¹, 10¹, but in receiving at the same time a special additional movement owing to the rotation of the spindle section 25 in the nut 31¹. Owing to the double movement given to the tube 4¹, the image plane of the optical system 5¹ will be always maintained, also in this construction of the instrument, in the image plane 6¹ of the eye-piece.

Figure 7:
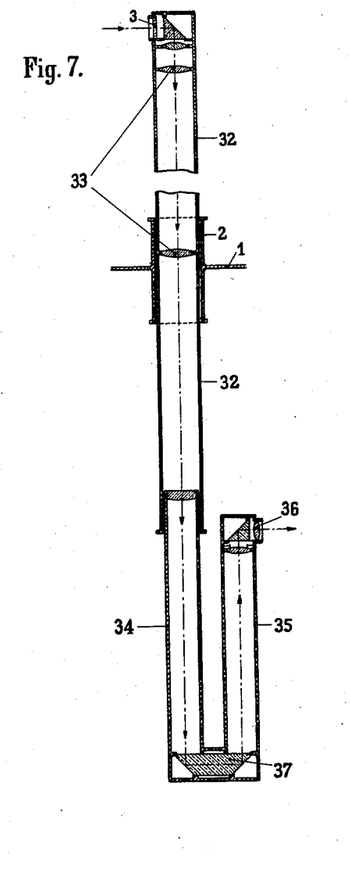
Figures 7 and 8 are diagrammatic longitudinal sections through instruments with a modified optical arrangement.

In the construction of the instrument diagrammatically indicated in Figure 7, the rigid adjustable casing part with the light admission opening is marked 32. It is provided with a telescopic system 33 and passes over one arm 34 of a U-shaped casing part, the other arm 35 of which carries the eye-piece 36. As the optical system 33 mounted in the tube 32, is a telescopic system, the tube 32 in this case can be moved, in the manner usual in periscopes, on the tubular branch 34, without any raising or lowering of the reflector 37 being required, which reflects the light towards the eye-piece 36.

Figure 8:
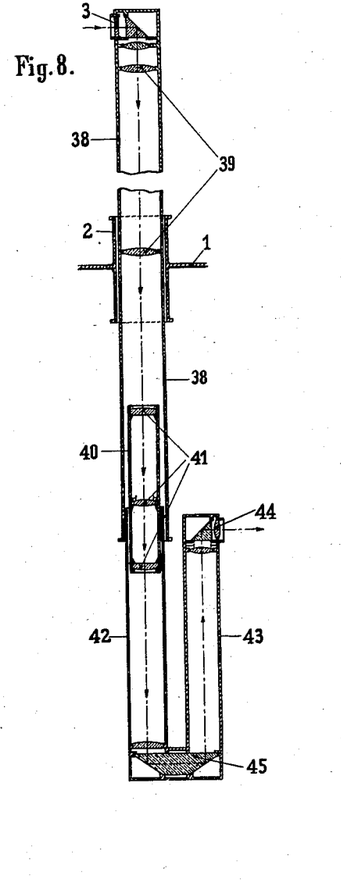

In the construction shown in Figure 8, the adjustable rigid tube part with the light admission opening, is marked 38, and in the same way as in the construction in Figure 7, provided with a telescopic system 39. This tube part passes over a tubular part 40 which carries a telescopic system 41. The tube part 40 is adjustable in one branch 42 of a U-shaped fixed casing part, the other U-branch 43 of which carries the eye-piece 44. Owing to the construction of the optical systems 39, 41 in the form of telescopic systems, the rigid tube 38 can be pushed over the tube part 40, as well as the tube part 40 in the tube branch 42, without a corresponding movement of the reflector 45 being necessary.

Also in the constructions in Figures 7 and 8, the advantage peculiar to the constructions in Figures 1–6, is retained, namely that practically the whole of the space available in the vertical direction, can be utilized for longitudinal movements, as in this movement it is not necessary to see that the observer should be reserved the room required. This is due to the fact that the eye-piece is laterally arranged next to the adjustable instrument casing, in such a manner that the lower portion of the adjustable part or parts of the casing can be pulled down to below the eye-piece.

The arrangement described in the foregoing, according to which the rigid casing part carrying the admission reflector of the periscope, can be lowered to below the eye-piece arranged laterally of it, offers, during the searching of the horizon, the difficulty that the casing part carrying the eye-piece, during the turning of the object-glass tube about its axis, would have to be also turned round the axis of the object glass tube, if an inclination and even reversal of the images is to be avoided depending upon the direction of vision and consequently upon the position of the admission reflector, and that accordingly the observer would also have to move round the axis of the object-glass tube, that is to say in a comparatively large circle. In order to save the large place thus required for the observer, the instrument could be formed in a well known manner into a so-called "look round" periscope, by switching into the path of rays between the object-glass and the eye-piece, at a suitable point, a so-called image erecting system which is rotated in function of the angle of turning of the admission reflector. This construction of the instrument as a "look round" periscope is however undesirable in certain circumstances.

Figure 9:
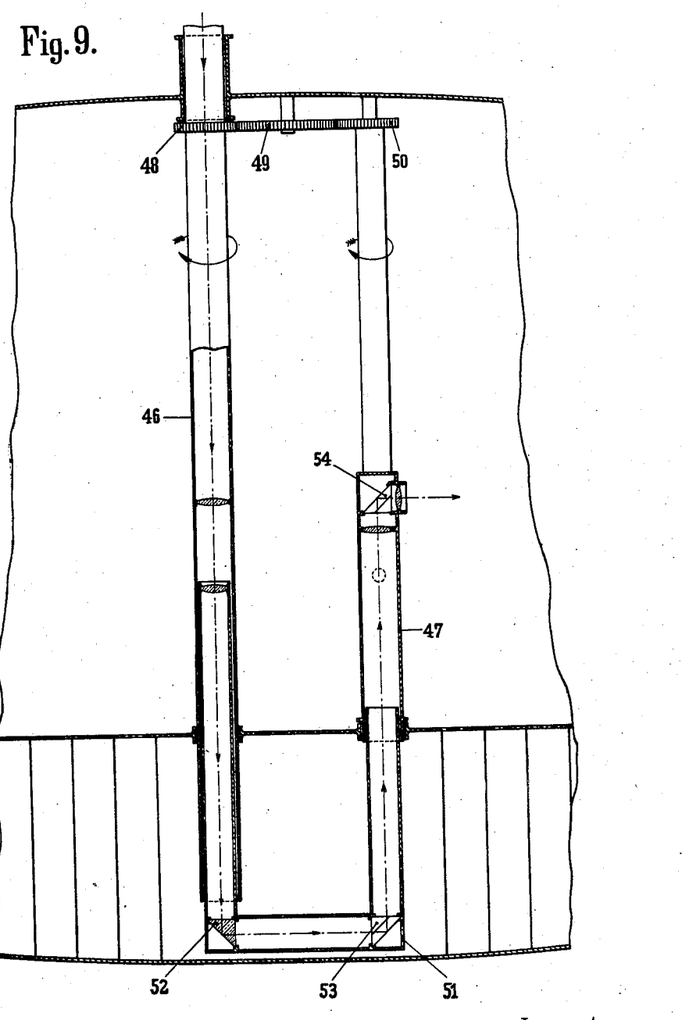
Figure 9 is a longitudinal section through a part of an instrument, the optical system of which corresponds, in the object-glass end, not shown in the drawing, to that of Figure 7 and which makes it possible to search the horizon without the observer having to go round the rotatable objectglass tube.

Figure 9 shows a construction of the instrument which allows a sweeping of the horizon, without the observer having to walk round the object-glass tube itself. According to Figure 9 which shows the lower part of an instrument, the part of the optical system of which, not shown, corresponds for instance to Figure 7, the object-glass tube 46 and the eye-piece tube 47 are connected so as to rotate together in the same direction, connecting means are diagrammatically indicated on the drawing as consisting of gear-wheels 48, 49, 50 of which gear 48 is assumed to be axially movable but not rotatable on tube 46, so as to allow axial shifting of said tube. The reflector casing 51 participates in the longitudinal movement of the tube section 46, but does not participate in its rotation. In this construction the direction of looking of the observer agrees always with the line of sighting of the instrument, so that a convenient orientation is ensured. When altering the line of sight or aiming, the observer, unlike in the construction of the instrument shown in Figures 1-8, need walk only round the eye-piece tube 47, but not round the object-glass tube 46, so that the room required for the observer, is kept within comparatively small limits. The reflector system mounted in the rotatable casing part 51, must fulfill the condition that during its rotation about an axis parallel to the axis of rotation of the object-glass or eye-piece-tube, it should not produce any rotation of the image in its plane. The reflector system must therefore have an odd number of reflector surfaces. According to the drawing, the reflector system is constituted by a three sided right angle prism 52 and a roof-edge prism 53. The image reversing produced by the two prisms 52, 53 in one direction, is again cancelled by the roof-edge prism 54 belonging to the eye-piece.

Figure 10:
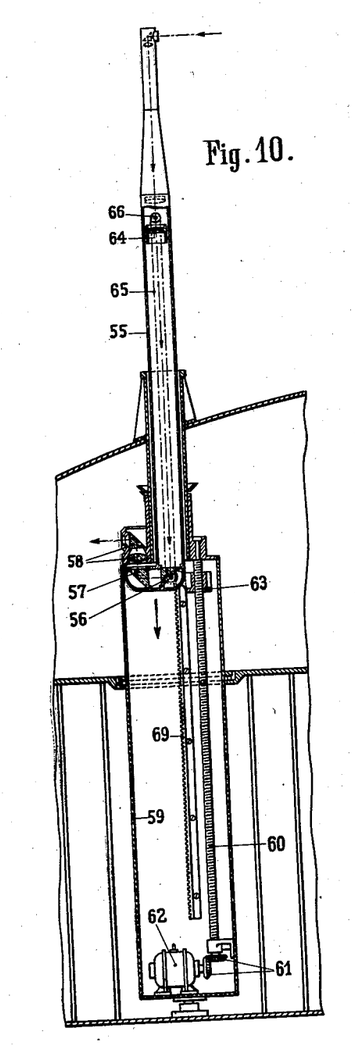
Figures 10 and 11 show in two axial sections rectangular to each other an embodiment of the periscope with reflectors cooperating with the eye-piece partaking in the sliding movement of the periscope tube.
Figure 11:
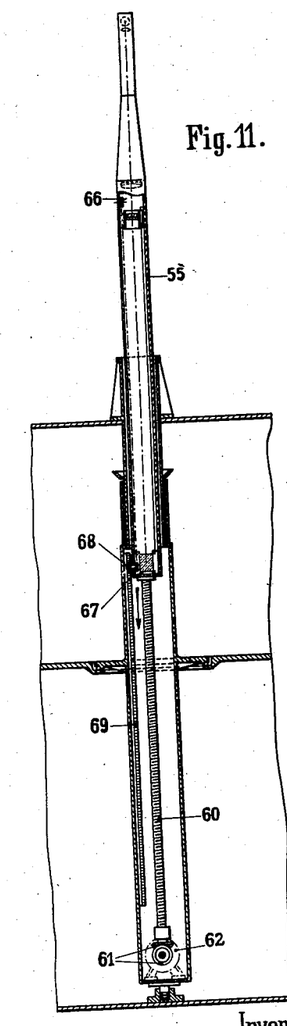

In the construction according to Figures 10 and 11 the pull- in and out part of the instrument is marked 55. Its lower end is secured to two deflecting prisms 56, 57 which are arranged in front of the angle eye-piece 58. The angle eye-piece 58 is secured to the guide casing 59 in which the instrument part 55 moves. The movement of the instrument part 55 is effected by means of a spindle 60 which can be turned by means of two bevel wheels 61, from an electric motor 62 mounted in the guide casing 59. The spindle 60 engages with a nut 63 secured to the instrument part 55. As the optical elements arranged in the instrument part 55 in front of the deflecting prisms 56, 57, participate in the movement of the said part—the said optical elements being here referred to for the sake of brevity as object-glass—the movements of the instrument part 55 would result in a movement of the object-glass image plane relatively to the image plane of the stationary eye-piece 58. In order to cancel the said movement of the image planes with relation to each other when the instrument part 55 is moved, the object-glass element 64 is adjustably mounted. According to the drawing, this movement of the object-glass part 64 takes place automatically. To that end, the object-glass part 64 is connected to an endless driving part 65 passing over guide rollers 66, 67, the latter of which is secured to a gear wheel 68 meshing with the teeth of a rack 69 which, in its turn, is secured to the guide casing 59. Each pull- in and out movement of the instrument part 55 results therefore in a rotation of the gear wheel 68, and therefore in a movement of the endless driving part 65 over the guide rollers 66, 67, the object-glass element 64 participating in the said movement. The ratio of transmission is so calculated that the object-glass element 64 is always in such a position, independently of the height at the time of the pull- out and in instrument part 55, that the object-glass image plane coincides with the eye-piece image plane. In order to maintain during the movement the same magnifying in spite of the shifting of the single object-glass element 64, the condition must be fulfilled that the object-glass part 64 should be struck by parallel pencils of rays.

Figure 12:
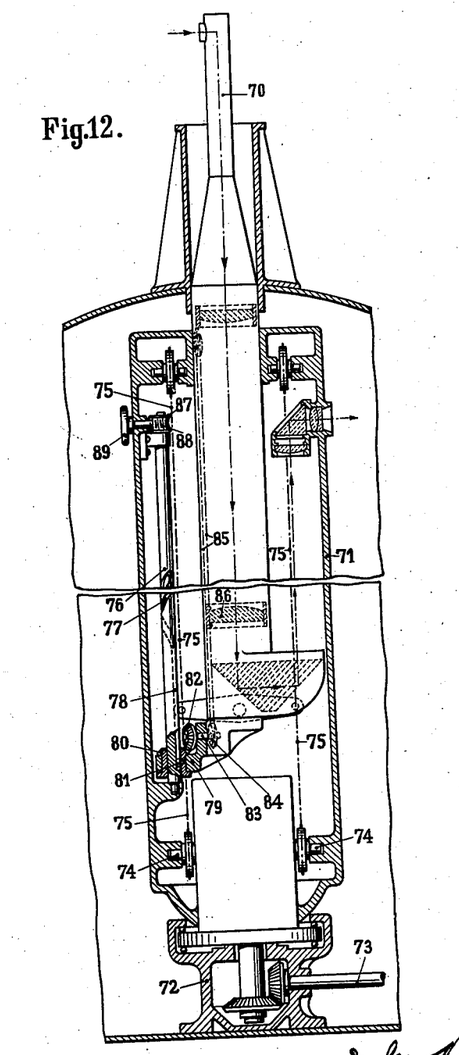
Figure 12 is an axial section through a further embodiment of the instrument with reflectors partaking in the sliding movement of the periscope tube and actuation of a lens element slidable within the slidable periscope tube by a rotatable spindle.

In the embodiment illustrated in Figure 12 the ray deviating reflectors which guide the rays to the fixed eye-piece are firmly connected to the pull- in and out tube of the instrument as they are in the instrument illustrated in Figures 10 and 11.

This embodiment is however distinguished from that of Figures 10 and 11 by a different driving mechanism for the slidable lens element within the pull- in and out tube. This driving mechanism being constructed with a view to the fact that it is practically impossible to secure proper observation in periscopes by suitably shifting an optical element if the pull- in and out tube is so much displaced as required in the use on submarines. According to Figure 12 the actuation of the shiftable lens element is effected in such a manner that its movement is interrupted before the end of the pull-in movement of the periscope tube.

In Figure 12 the pull-out periscope is marked 70. It is surrounded by a rotatable casing 71 which is mounted on a fixed base or bearing 72. Into the fixed bearing 72 is introduced the motor shaft 73, the movement of which is transmitted by a gear (which does not form part of the invention and is therefore not shown in the drawing) to a lifting spindle 74 which, by means of endless traction parts 75, brings about the vertical adjustment of the instrument. In the rotatable casing 71 is mounted a spindle 76, the screw-thread 77 of which terminates at the bottom end of the spindle in a rectilinear groove 78. In the foot 79 of the pull-out periscope is mounted a toothed wheel 80 which is adjustable on the spindle 76 and engages, by means of a pin 81, with the spindle groove 78, 77. This toothed wheel 80 meshes with a toothed wheel 82 on a spindle 83 also mounted in the foot 79 of the periscope, which carries a sprocket wheel 84 over which passes an endless chain 85 which engages with the adjustable lens element 86 of the periscope. On the upper end of the spindle 76 is mounted a worm wheel 87 with which meshes a worm 88, the spindle of which is provided outside the rotatable casing 71, with an operating button 89.

When during the pulling out of the periscope from the lowest position shown in the drawing, the periscope foot 79 is moved upwards, the toothed wheel 80 will participate in the said movement, and the pin 81 will travel in the spindle groove. As long as the movement takes place in the rectilinear groove 78 parallel to the axis of the spindle, the spindle 83 remains stationary, and the lens element remains accordingly stationary relatively to the periscope. As soon as the pin engages with the screw-thread 77 of the groove, the toothed wheel 80 begins to rotate, and accordingly the spindle 83 also rotates, so that the lens element 86 is moved in the periscope in accordance with the pitch of the screw-thread 77.

During the pull-out movement of the periscope, the spindle 76 does not rotate. In order however to ensure at any moment the possibility of obtaining a sharp setting of the image, the spindle is arranged for turning in the casing 71, for which purpose is provided the above mentioned worm gear 87, 88. By turning the setting knob 89, it is possible to produce at will a turning of the spindle, and thus to effect an adjustment of the lens element 86 independently of the vertical adjustment of the periscope.

Figure 13:
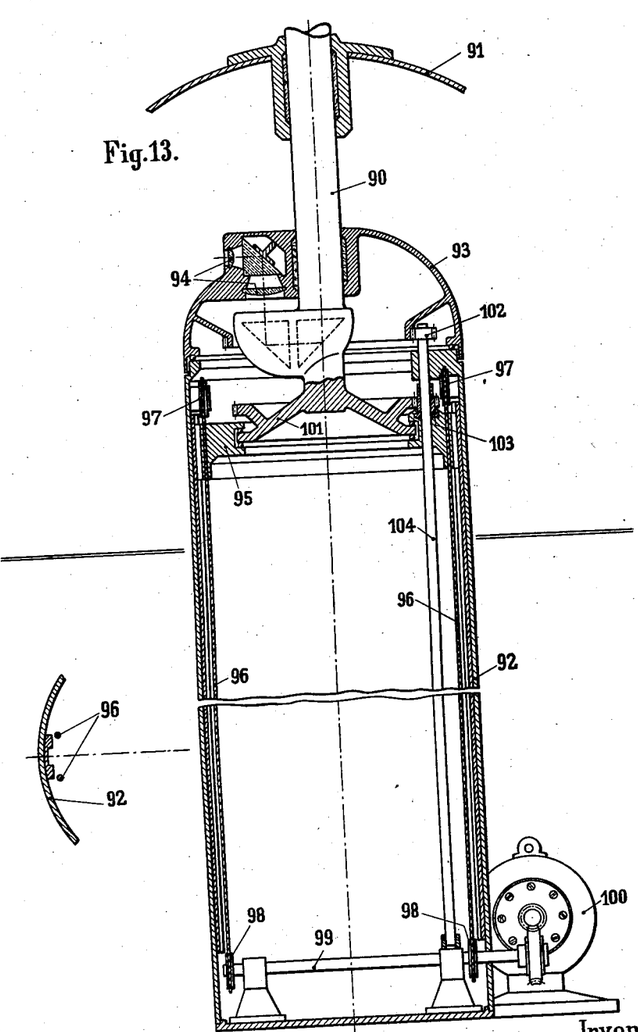
Figure 13 is an embodiment of a periscope in accordance with the invention with variable direction of vision and with a rotatable eye-piece carrying cap mounted on a fixed casing for the sensible elements of the instrument.

In the embodiment illustrated in Figure 13 provided with an eye-piece carrying cap rotatable, but not shiftable with the pull- in and out tube the latter is marked 90. At 91 is indicated the deck of the ship, through which the tube is carried in a water-tight manner. The enclosing casing for the instrument parts situated inside the ship, is marked 92, and its rotatable cap 93. In the rotatable cap is mounted the angular eye-piece 94 of the instrument. In the casing 92 secured in the ship's space is guided a ring 95 in such a manner that it can move up and down in the casing without rotating. The ring 95 is suspended to chains or ropes 96 which pass in the casing 92 over sprocket wheels or pulleys 97 and are driven from the sprocket wheels or pulleys 98 on the common spindle 99 which passes outwards through the casing 92 and receives here its drive by means of a suitable motor 100. In the ring 95 is rotatably mounted a foot piece 101 of the tube 90. The coupling or connection between the tube 90 and the eye-piece cap 93 is effected by means of toothed wheels 102, 103, which are mounted on a common spindle 104, and of which the toothed wheel 103 engaging with the foot piece 101 of the tube 90, is mounted on the spindle 104 so as to be adjustable, but not rotatable The working of the device is as follows: When the tube 90 is to be raised or lowered, without changing its horizontal adjustment, the spindle 99 is rotated by the motor 100 and transmits its rotation through the ropes or chains 96 to the ring 95, and through the latter, to the tube 90. When it is desired to alter the horizontal adjustment of the instrument, without altering the vertical position, the cap 93 is turned, for instance by using a handle not shown in the drawing. This turning of the cap 93 will be transmitted by the toothed wheel 102 engaging with a set of teeth of the cap, to the spindle 104, and therefore to the toothed wheel 103 which, independently of the vertical position of the tube 90, is in permanent mesh with a set of teeth of the foot portion 101 of the tube 90, so that any rotation of the spindle 104 results in a corresponding rotation of the tube 90. The pulling out or in of the tube 90 can also be effected simultaneously with a change in the horizontal adjustment.

What I claim is :—

1. In a periscope, more particularly for submarines, a casing for the optical elements of the instrument consisting of at least two parts axially shiftable with relation to each other the one provided with a light admission opening and with an optical system firmly mounted therein having a finite focal length and a further casing part being provided with the eye-piece, the instrument further provided with a reflecting device arranged in the path of rays between the light admission opening and the eye-piece, driving spindles in co-operative connection as well with the casing part provided with the light admission opening as with the reflecting device, a reflector driving spindle rotatable within a nut in firm connection with the casing part provided with the eye-piece and interconnected and geared with the spindle actuating device for the casing part provided with the light admission opening.

2. In a periscope, more particularly for submarines, a casing for the optical elements of the instrument consisting of at least two parts axially shiftable with relation to each other the one provided with a light admission opening and with an optical system firmly mounted therein having a finite focal length and a further casing part being provided with the eye-piece, the instrument further provided with a reflecting device arranged in the path of rays between the light admission opening and the eye-piece, two sets of driving spindles one in co-operative connection with the reflecting device and the other with the casing part with the light admission opening, both sets of spindles being mounted next to each other rotatably and nonadjustably in a plate-like part of the reflector casing and a central driving gear wheel co-operative with both said sets of spindles, guiding nuts for said sets of spindles mounted respectively in a carrier firmly connected with the casing part with the eye-piece and with the casing part with the light admission opening.

In testimony whereof I have signed this specification.

JULES HUMBRECHT.